United States Patent
Kenmochi et al.

(10) Patent No.: US 7,755,711 B2
(45) Date of Patent: Jul. 13, 2010

(54) LIQUID CRYSTAL DEVICE AND ELECTRONIC APPARATUS

(75) Inventors: Nobuhiko Kenmochi, Shiojiri (JP); Mitsutoshi Miyasaka, Suwa (JP)

(73) Assignee: Seiko Epson Corporation, Tokyo (JP)

(*) Notice: Subject to any disclaimer, the term of this patent is extended or adjusted under 35 U.S.C. 154(b) by 201 days.

(21) Appl. No.: 11/956,095

(22) Filed: Dec. 13, 2007

(65) Prior Publication Data
US 2008/0158461 A1 Jul. 3, 2008

(30) Foreign Application Priority Data
Dec. 27, 2006 (JP) .............................. 2006-350966

(51) Int. Cl.
G02F 1/136 (2006.01)
(52) U.S. Cl. .................... 349/48; 349/25; 349/38; 349/110; 349/151; 345/91
(58) Field of Classification Search .............. 349/43, 349/110, 143, 111, 139, 44, 46–48, 38, 42, 349/138, 149, 151, 25, 28; 345/91
See application file for complete search history.

(56) References Cited

U.S. PATENT DOCUMENTS
6,297,862 B1 10/2001 Murade
7,158,201 B2 * 1/2007 Kim et al. ................... 349/129
2002/0105603 A1 8/2002 Yoo et al.

FOREIGN PATENT DOCUMENTS
EP 0 685 757 A2 12/1995
JP 07-325319 12/1995
JP 2001-292276 10/2001
JP 2006-003857 1/2006

* cited by examiner

Primary Examiner—Thoi V Duong
(74) Attorney, Agent, or Firm—Workman Nydegger

(57) ABSTRACT

A liquid crystal device includes: a first scan line, a second scan line parallel to first scan line, a signal line intersecting the first scan line, a pixel arranged in a matrix; and a first light-shielding film. The pixel includes: a first transistor having a gate coupled to the first scan line, a source, and a drain, wherein either the source or drain is coupled to the signal line; a pixel electrode coupled to remaining source or drain of the first transistor; a common electrode disposed facing the pixel electrode; a liquid crystal layer disposed between the pixel electrode and common electrode; a second transistor having a gate coupled to the second scan line, wherein a source or drain of the second transistor is coupled to a source or drain of the first transistor, and the other source or drain is coupled to a power source line.

15 Claims, 15 Drawing Sheets

LIQUID CRYSTAL DEVICE AND ELECTRONIC APPARATUS

The entire disclosure of Japanese Patent Application No. 2006-350966, filed Dec. 27, 2006 is expressly incorporated herein by reference.

BACKGROUND

1. Technical Field

The present invention relates to a liquid crystal device and an electronic apparatus.

2. Related Art

Recently, liquid crystal devices have been developed that are capable of capturing an optical input in a display area. Examples of such liquid crystal devices which are provided with a matrix layout of pixels with photoelectric conversion functions included in each pixel are disclosed in Japanese Patent Applications JP-A-2001-292276 and JP-A-2006-3857. In these liquid crystal devices, the pixel having the photoelectric conversion function stated is composed of a pin diode or the like and a plurality of transistors. Using the described configuration, the display of the liquid crystal device that is used to display images is also used as an input device.

One difficulty of the described devices, however, is that each pixel of the device requires five to seven switching transistors and a pin diode, as shown in FIG. 2 of JP-A-2001-292276, and FIG. 3 of JP-A-2006-3857. Compared to common liquid crystal devices of the art, which are incapable of optical input, each pixel of the liquid crystal device capable of an optical input each pixel requires a much larger number of elements (transistors and a pin diode) per pixel, since the pixels of the common liquid crystal devices require only one transistor and no pin diode.

Because the pixels of the liquid crystal device capable of an optical input require more elements, the resulting device has a complicated structure. Moreover, each pixel has a reduced aperture ratio, the displayed images are darkened, and overall quality of images is deteriorated and have a lowered contrast.

BRIEF SUMMARY OF THE INVENTION

One advantage of the present invention is a liquid crystal device capable of an optical input with a simplified pixel structure and enhanced image quality.

One aspect of the invention is a liquid crystal device comprising: a first scan line, a second scan line arranged in parallel with the first scan line, a signal line arranged so as to intersect with the first scan line, a pixel arranged in a matrix with respect to the intersection between the first scan line and the signal line, the pixel including: a first transistor having a gate coupled to the first scan line, a source, and a drain, wherein either the source or drain is coupled to the signal line; a pixel electrode coupled to the remaining source or drain of the first transistor; a common electrode disposed so as to face to the pixel electrode; a liquid crystal layer disposed between the pixel electrode and the common electrode; a second transistor having a gate coupled to the second scan line, a source, and a drain, wherein either the source or drain is coupled to the remaining source or drain of the first transistor, and the other of the source or drain of the second transistor is coupled to a power source line; and a first light-shielding film which covers one side of the first transistor and the second transistor.

A liquid crystal device according to a second aspect of the invention includes a first scan line, a second scan line arranged in parallel with the first scan line, a signal line arranged so as to intersect with the first scan line, a pixel arranged in a matrix with respect to the intersection between the first scan line and the signal line, the pixel comprising: a first transistor having a gate coupled to the first scan line, a source, and a drain, wherein either the source or the drain is coupled to the signal line; a pixel electrode coupled to the remaining source or drain of the first transistor; a common electrode disposed so as to face to the pixel electrode; a liquid crystal layer disposed between the pixel electrode and the common electrode; a second transistor having a gate coupled to the second scan line, a source, and a drain, wherein either the source or drain is coupled to the remaining source or drain of the first transistor, and the remaining source or drain of the second transistor is coupled to a power source line; a third transistor coupled to the first transistor in series between the signal line and the pixel electrode, the third transistor having a gate coupled to the first scan line, a source, and a drain, wherein either the source or drain of the third transistor is coupled to the remaining source or drain of the first transistor, and the remaining source or drain of the third transistor is coupled to the pixel electrode; and a first light-shielding film which covers one side of the first transistor, second transistor, and third transistor.

In both the liquid crystal devices described above, an off current is created because the first transistor is exposed to light. Using this current, the first transistor is in an off state while the second transistor is in an on state. By detecting the location of the off current, the position and size of the first transistor may be detected, and a signal may be generated. Using this signal, the liquid crystal device of the first aspect of the invention is capable of receiving an optical input while displaying an image. Further, the configuration of each pixel is simplified, thereby providing improved image quality when the image is displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
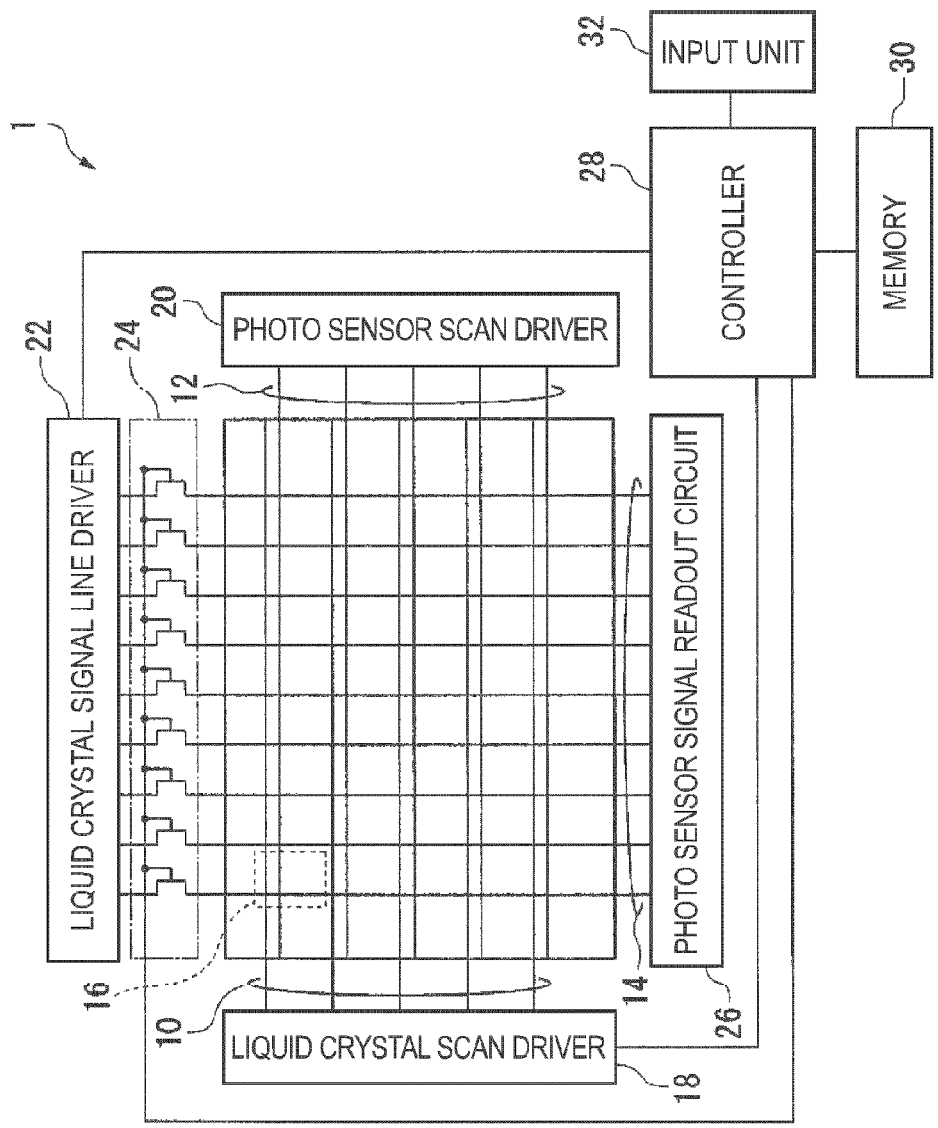
FIG. 1 is a block diagram illustrating a configuration of a first embodiment of a liquid crystal device according to a first aspect of the invention.

Various embodiments of a liquid crystal and an electronic apparatus according to the invention will be described below with reference to the drawings. Note that the scale of each member in the drawings may be modified so as to more clearly describe the invention.

I. Liquid Crystal Display Device

A. First Embodiment

FIG. 1 is a block diagram illustrating a configuration of a liquid crystal device according to a first embodiment. In the example shown in FIG. 1, the liquid crystal device 1 is provided with liquid crystal scan lines 10 (also referred to as "first scan lines"), photo sensor scan lines 12 (also referred to as "second scan lines"), signal lines 14, pixels 16, a liquid crystal scan driver 18 (also referred to as a "first scan driver"), a photo sensor scan driver 20 (also referred to as a "second scan driver"), a liquid crystal signal line driver 22, switching circuits 24, a photo sensor signal readout circuit 26, a controller 28, a memory 30, and an input unit 32.

In this example, the liquid crystal scan lines 10 and the photo sensor scan lines 12 are equal in number and disposed in parallel with each other, while the signal lines 14 are disposed so as to intersect with the liquid crystal scan lines 10 and the photo sensor scan lines 12. The pixels 16 are arranged in a matrix (matrix layout) so as to correspond with the intersections between the liquid crystal scan lines 10, photo sensor scan lines 12, and the signal lines 14.

The liquid crystal scan driver 18 is coupled with one end of each of the liquid crystal scan lines 10. The liquid crystal scan driver 18 selects the liquid crystal scan lines 10 by supplying a predetermined control signal (scanning signal) to the liquid crystal scan lines 10.

The photo sensor scan driver 20 is coupled to one end of each of the photo sensor scan lines 12. The photo sensor scan driver 20 selects the photo sensor scan lines 12 by supplying a predetermined control signal to the photo sensor scan lines 12. Similarly, the liquid crystal signal line driver 22 is coupled to one end of each of the signal lines 14, and selects the signal lines 14 by providing an image signal to each of the signal lines 14.

The switching circuits 24 are located between the pixels 16 and the liquid crystal signal line driver 22. The switching circuits 24 operate by switching the signal lines 14 between a conductive state and a non-conductive state after receiving a signal from the liquid crystal signal line driver 22 based on a control signal supplied from the controller 28. The switching circuits 24 are in a conductive state when being written by the liquid crystal signal line driver 22 and in a non-conductive state when being read by the photo sensor signal readout circuit 26.

The photo sensor signal readout circuit 26 is coupled to the other end of each of the signal lines 14. The photo sensor signal readout circuit 26 selects a signal line 14 and reads an electric current of the selected signal line as a photo sensor signal. Further, the photo sensor signal readout circuit 26 includes a signal line selection circuit, such as a shift register and a decoder, and a current measurement circuit, such as an amplifier circuit and a comparison circuit, and amplifies the imperceptible signal of the signal line.

The controller 28 supplies a control signal to the liquid crystal scan driver 18, photo sensor scan driver 20, liquid crystal signal line driver 22, switching circuits 24, and photo sensor signal readout circuit 26. The controller 28 is coupled to a memory 30. In the first embodiment, the controller 28 obtains data read out by the photo sensor signal readout circuit 26 (hereinafter, referred to as "readout data") and stores it in the memory 30. Further, the controller 28 updates image data preliminarily stored in the memory 30 and supplies a control signal corresponding to the image data to the liquid crystal signal line driver 22 based on the readout data, as described more fully below.

The memory 30 comprises a semiconductor memory such as DRAM and SRAM, and serves as a video memory capable of storing image data and other functions, including storing various data produced or used by the controller 28.

The input unit 32 is coupled to the controller 28, and sends various input orders from a user to the controller 28. The input unit 32 represents a direction indicator key (an arrow key or the like), a push button, or the like.

Figure 2:
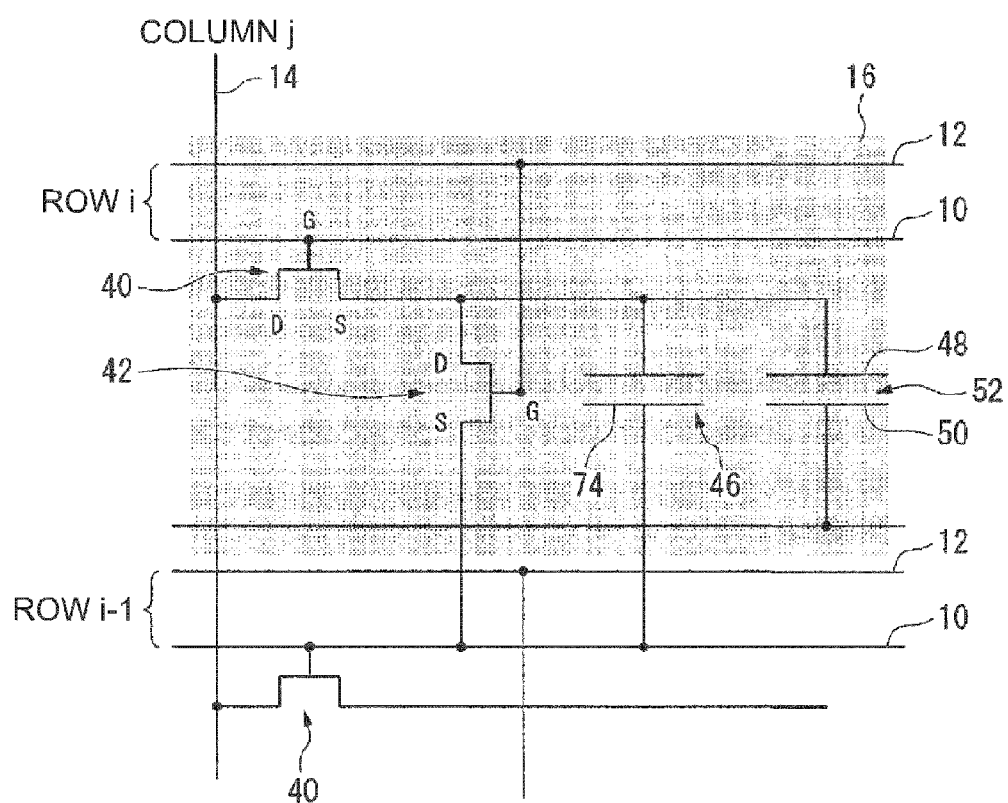
FIG. 2 is a circuit diagram illustrating a configuration of a pixel included in the liquid crystal device of the first embodiment of the invention.

FIG. 2 is a circuit diagram illustrating a detailed configuration of a pixel. In FIG. 2, one of the pixels 16 located in a row i and a column j (with i and j corresponding to natural numbers) is shown. However, other pixels 16 in other rows and columns have the same configuration. As shown in the figure, the pixel 16 is formed at an intersection of the liquid crystal scan line 10 on the row i and the photo sensor scan line 12 on the row i with the signal line 14 on the column j, and includes a liquid crystal switching transistor 40 (first transistor), a photo sensor switching transistor 42 (second transistor), a pixel electrode 48, a common electrode 50, a liquid crystal layer 52, and a storage capacitor 46.

In the liquid crystal switching transistor 40, a gate (G) and a source/drain is coupled to the liquid crystal scan line 10 on the row i. In this example, a drain (D) is coupled to the signal line 14 on the column j. The liquid crystal switching transistor 40 is preferably has an offset configuration.

In the photo sensor switching transistor 42, a gate (G) and source/drain is coupled to the photo sensor scan line 12 on the row i. In this example a drain (D) is coupled to a source (S) of the liquid crystal switching transistor 40. Further, the other of the source/drain of the photo sensor switching transistor 42 is coupled to a power source line. In this example, the source (S) is coupled to the power source line. The power source line can comprise a part of the photo sensor switching transistor 42, a separately formed wiring, or the liquid crystal scan line 10 on the row i–1 of a preceding stage, for example. In this embodiment, the liquid crystal scan line 10 on the row i–1 is used as the power source line. As above, by using the liquid crystal scan line 10 on the row i–1, the aperture ratio of the pixel can be enhanced.

The pixel electrode 48 is coupled to the source/drain of the liquid crystal switching transistor 40 that is not connected to the liquid crystal transistor 40 (the source (S), in this example). The common electrode 50 is arranged so as to face to the pixel electrode 48. The liquid crystal layer 52 is arranged between the pixel electrode 48 and the common electrode 50.

The storage capacitor 46 is coupled between the source/drain that is not connected to the liquid crystal transistor 40 (the source (S) in this example) and the liquid crystal scan line 10 on the row i–1. One electrode of the storage capacitor 46 is coupled to the liquid crystal scan line 10 on the row i–1 of the preceding stage, which reduces the amount of wiring and improve the aperture ratio in the pixel. In this case, the liquid crystal scan line 10 in the preceding stage is used as a reference potential. Alternatively, another wiring can be formed to be coupled with the electrode of a storage capacitor 46, in order to enhance the contrast of the display.

The storage capacitor 46 is preferably coupled with the preceding stage so as to supply a reference potential, and is, preferably formed from a transparent conductive film.

Figure 3:
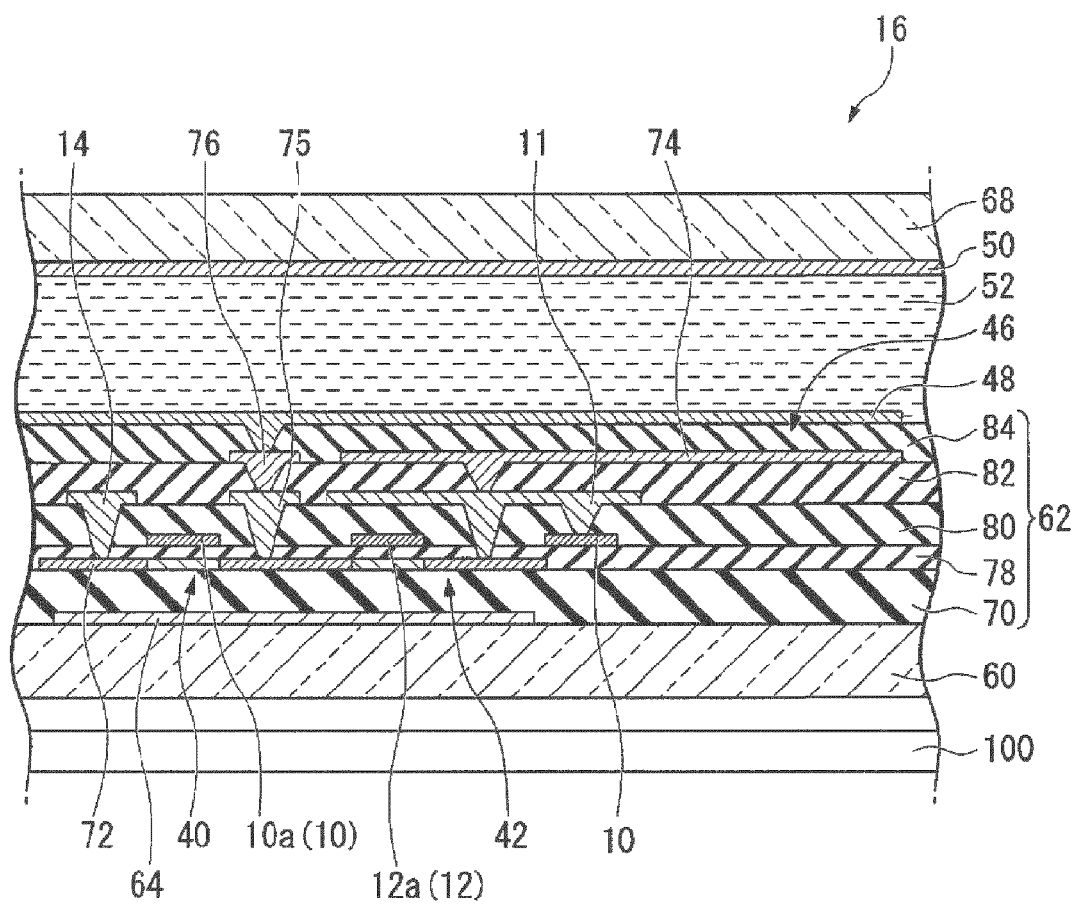
FIG. 3 is a partial sectional view illustrating a configuration of the pixel included in the liquid crystal device of the first embodiment of the invention.

FIG. 3 is a partial sectional view illustrating a configuration of the pixel of the liquid crystal device. As shown in FIG. 3, the liquid crystal device 1 is provided with a first substrate 60 that is transparent, a circuit layer 62 disposed on the first substrate 60 which contacts the pixel electrode 48, a first light-shielding film 64 arranged on a predetermined position between the first substrate 60 and the circuit layer 62, a second substrate 68 that is transparent which is placed facing to the first substrate 60 with the common electrode 50 formed thereon, a liquid crystal layer 52 arranged between the first substrate 60 and the second substrate 68, and a backlight 100 disposed on the bottom of the first substrate 60.

The liquid crystal device 1 according to the first embodiment modulates incident light from the backlight 100 at the liquid crystal layer 52, and has a configuration in which a displayed image is viewed from the top of the second substrate 68. Therefore, the first substrate 60 and the second substrate 68 are transparent to visible light. In a preferred embodiment, the first substrate 60 is a substrate being transparent to visible light, which is made of a glass substrate or a plastic substrate, for example.

The circuit layer 62 includes the liquid crystal scan line 10, the photo sensor scan line 12, the signal line 14, the liquid crystal switching transistor 40, the photo sensor switching transistor 42, and the storage capacitor 46. As shown in the figure, both of the liquid crystal switching transistor 40 and the photo sensor switching transistor 42 are formed of thin film transistors.

The first light-shielding film 64 is formed under the liquid crystal switching transistor 40 and the photo sensor switching transistor 42, and is positioned between the first substrate 60 and the circuit layer 62 so as to overlap the liquid crystal switching transistor 40 and the photo sensor switching transistor 42 in the vertical direction (the direction in which the first substrate 60, the circuit layer 62, the liquid crystal layer 52, the second substrate 68 and others are laminated). The light-shielding film 64 is preferably a metal film made of aluminum, chromium or the like. Accordingly, a semiconductor film portion of the liquid crystal switching transistor 40 and a semiconductor film portion of the photo sensor switching transistor 42 more fully described below are shielded so that the light from the backlight 100 does not enter.

The first light-shielding film 64 is preferably formed in a position so as to overlap with at least one active region of either the semiconductor film portion of the liquid crystal switching transistor 40 or the semiconductor film portion of the photo sensor switching transistor 42. The "active region" here indicates an intrinsic region between a channel forming region and a drain region, with an intrinsic region being between the channel forming region and a source region. Thus, the first light-shielding film 64 can prevent occurrence of an off state current from the liquid crystal switching transistor 40 and the photo sensor switching transistor 42 caused by light from the backlight 100.

Now, the configuration of the circuit layer 62 will be described in detail. The circuit layer 62 is comprised of an insulating film 70 serving as an underlying protective film. The insulating film 70 is formed on the first substrate 60 so as to cover the first light-shielding film 64. An island-like shaped semiconductor film 72 is formed on an upper surface of the insulating film 70 which serves as an underlying protective film. Preferably, the semiconductor film 72 is made of high-temperature polysilicon or low temperature polysilicon, and is shared between the liquid crystal switching transistor 40 and the photo sensor switching transistor 42, as shown in FIG. 3.

The gate insulating film 78 is formed on the insulating film 70 so as to cover the semiconductor film 72. Alternatively, the semiconductor film can be thermally oxidized. The insulating film 78 serves as a gate insulating film for each transistor. The liquid crystal scan line 10 and the photo sensor scan line 12 are formed in a predetermined position above the semiconductor film 72 and insulating film 78, which serve as an underlying protective film. An insulating film 80 which serves as a first interlayer insulating film is formed on the insulating film 78 so as to cover the liquid crystal scan line 10 and the photo sensor scan line 12.

The signal line 14 is formed on the insulating film 80, and is coupled to the semiconductor film 72 through a contact hole arbitrarily formed in the insulating film 80. Similarly, a wiring 11 (made of a same kind of metal as the signal line formed on the same layer) is formed on the insulating film 80, and coupled to the semiconductor film 72 through a contact hole arbitrarily formed in the insulating film 80. The signal line 14 and the wiring 11 are made of metal such as Al, which is capable of blocking light. Further, a part of the wiring 11 is preferably formed to cover the active region of the semiconductor film serving as a photo sensor switching transistor in the vertical direction.

An insulating film 82 which serves as a second interlayer insulating film is formed on the insulating film 80 to cover the wiring 11, the signal line 14, and other wiring 75. One electrode 74 of the storage capacitor 46 is formed in a predetermined position of the insulating film 82. More specifically, the storage capacitor 46 is formed in a position so as not to overlap with the liquid crystal switching transistor in the vertical direction. Then, the electrode 74 is coupled to the wiring 11 through a contact hole arbitrarily formed in the insulating film 82.

The insulating film 84 is formed on the insulating film 82 so as to cover the one electrode 74 and the wiring 76. In the first embodiment, since it is assumed that light from the backlight 100 is modulated and viewed from the top of the second substrate 68, a transparent material, such as a silicon oxide film. is used to form each of the insulating films 70, 78, 80, 82, and 84 stated above.

The pixel electrode 48 is coupled to the wiring 76 through a contact hole formed on a predetermined position in the insulating film 84. The wiring 76 is coupled to the wiring 75 through a contact hole formed in the insulating film 82. Accordingly, the pixel electrode 48 is electrically coupled with the semiconductor film 72 through the wirings 75 and 76.

Further, the storage capacitor 46 is formed with the pixel electrode 48, the electrode 74, with a insulating film 84 between them. The pixel electrode 48 and the one electrode 74 are formed using a transparent conductive film such as indium tin oxide (ITO). By using a transparent conductive film, the liquid crystal device 1 according to the first embodiment is able to modulate light from the back light 100 while images are viewed from the second substrate 68 side. That is, the storage capacitor 46 is coupled with the preceding stage, which is used as a reference potential. Also, the storage capacitor 46 is formed by forming a transparent conductive film on the insulating film 84.

The first substrate 60 with the pixel electrode 48 and second substrate 68 with the common electrode 50 are arranged so as to oppose each other. A transparent conductive film, such as ITO, is used as the common electrode 50. The liquid crystal layer 52 is formed between the pixel electrode 48 and the common electrode 50. The liquid crystal layer 52 includes a liquid crystal material and an alignment film which is used to define the alignment direction of liquid crystal molecules in the liquid crystal material.

Figure 4:
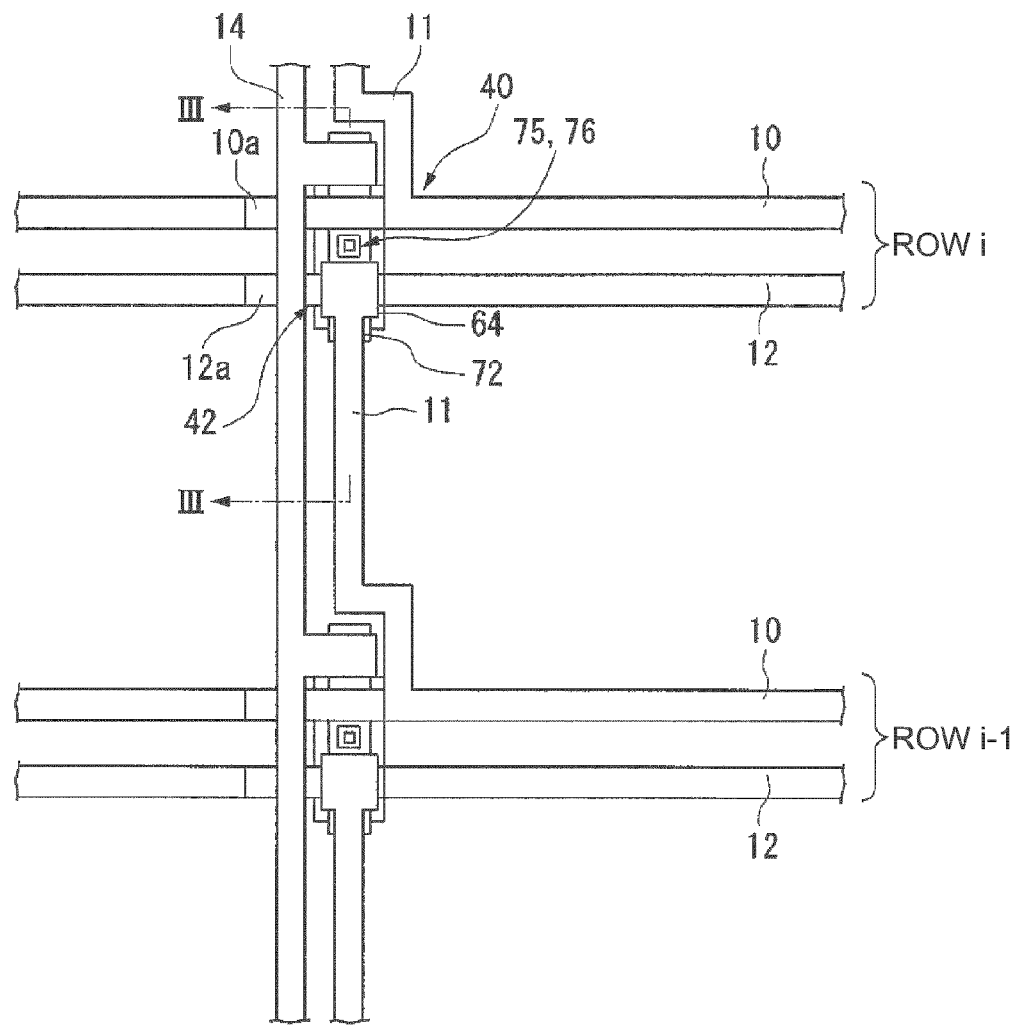
FIG. 4 is a partial view illustrating the wiring structure of the pixel included in the liquid crystal device of the first embodiment of the invention.

Next, the wiring structure of the pixel 16 will be explained referring to FIG. 4. FIG. 4 is a partial plan view showing the wiring structure of the pixel 16. The sectional view shown in FIG. 3 corresponds to the III-III cross-section shown in FIG. 4. In order to facilitate understanding, the transparent conductive film and the pixel electrode are omitted.

As shown in FIG. 4, the first light-shielding film 64 is located under the semiconductor film 72, and is arranged in a position so as to overlap with the active region of the semiconductor film portion of the liquid crystal switching transistor 40 and the active region of the semiconductor film portion of the photo sensor switching transistor 42. The semiconductor film 72 is shared by the liquid crystal switching transistor 40 and the photo sensor switching transistor 42. The liquid crystal scan line 10 and the photo sensor scan line 12 are formed above the semiconductor film 72.

A portion of the liquid crystal scan line 10 intersects with the semiconductor film 72, that is a portion 10a serving as a gate electrode of the liquid crystal switching transistor 40, and a portion 12a of the photo sensor scan line 12 intersect with a portion of the semiconductor film 72 which serves as a gate electrode of the photo sensor switching transistor 42, which is preferably formed with a transparent conductive member such as ITO.

The signal line 14 made of metal such as Al and other wiring 11 are formed on a layer above the liquid crystal scan line 10 and the photo sensor scan line 12. The wiring 11 is coupled to the semiconductor film 72 in an area corresponding to the photo sensor switching transistor 42 through a contact hole. The wiring 11 is also coupled with the liquid crystal scan line 10 on the row i−1 as illustrated. Further, as shown in FIG. 4, a portion of the wiring 11 is preferably formed so as to cover the active region of the semiconductor film serving as a photo sensor switching transistor.

Further, contact holes 75 and 76 are formed in a center of the semiconductor film 72, in a area corresponding to the liquid crystal switching transistor 40 and the photo sensor switching transistor 42. Through the contact holes 75 and 76, the semiconductor film 72 and the pixel electrode 48 are electrically coupled.

A method for forming the wiring and is shown in FIGS. 5 through 9. The forming steps will be described in brief according to the figures. The descriptions on the insulating films between the wirings are omitted.

Figure 5:
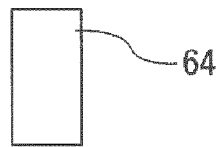
FIG. 5—is a diagram illustrating a method of forming the wiring structure of a pixel included in the liquid crystal device of the first embodiment of the invention.
Figure 5:
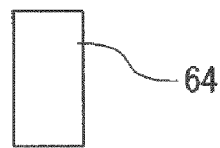
Figure 6:
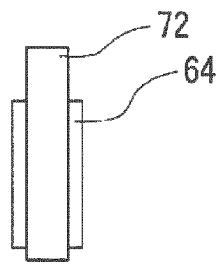
FIG. 6 is a second diagram illustrating a method of forming the wiring structure of the pixel of the liquid crystal device of the first embodiment of the invention.
Figure 6:
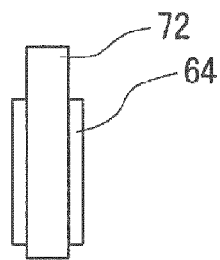

First, as shown in FIG. 5, the first light-shielding film 64 is formed in a predetermined position on the first substrate 60. Then, as shown in FIG. 6, the semiconductor film 72 is formed so as to overlap a part of the first light-shielding film 64. The semiconductor film 72 may be formed from a high temperature polysilicon film or a low temperature polysilicon film formed and patterned to be an island-like shape.

Figure 7:
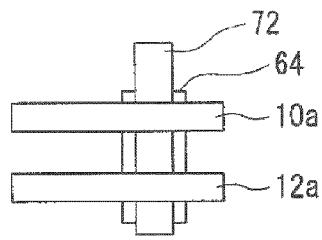
FIG. 7 is a third diagram illustrating a method of forming the wiring structure of the pixel of the liquid crystal device of the first embodiment of the invention.
Figure 7:
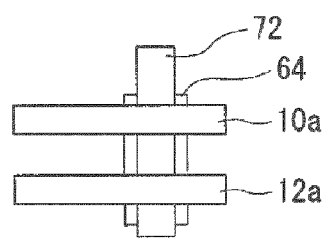

Next, as shown in FIG. 7, a portion 10a of the scan line 10 serving as a gate electrode of the liquid crystal switching transistor 40 and the portion 12a of the sensor scan line serving as a gate electrode of the photo sensor scan line 12 are formed. The portions 10a and 12a of the lines are formed from a transparent conductive film such as ITO, and are formed into a pattern. By using the transparent conductive film as a gate electrode, the active layer is lit when the liquid crystal switching transistor is used as a photo sensor, which improves the sensitivity of the photo sensor. When the liquid crystal switching transistor is used as a photo sensor, a small amount of current leakage is measured in the off state of the transistor. This small current leakage occurs at the border between the channel forming region and a drain region. Even when the gate electrode is a metal film capable of blocking light, the current leakage occurs since the light is diffracted at the end of the gate electrode and directed toward the drain end. However, the efficiency may be increased by using a transparent electrode.

Figure 8:
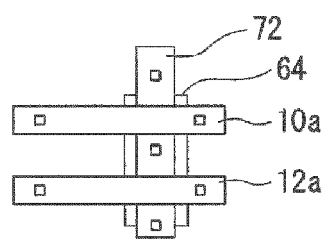
FIG. 8 is a fourth diagram illustrating a method of forming the wiring structure of the pixel included in the liquid crystal device of the first embodiment of the invention.
Figure 8:
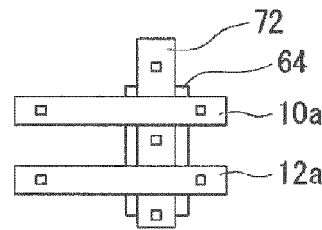

Then, as shown in FIG. 8, a series of contact holes are formed in predetermined positions of an insulating film.

Figure 9:
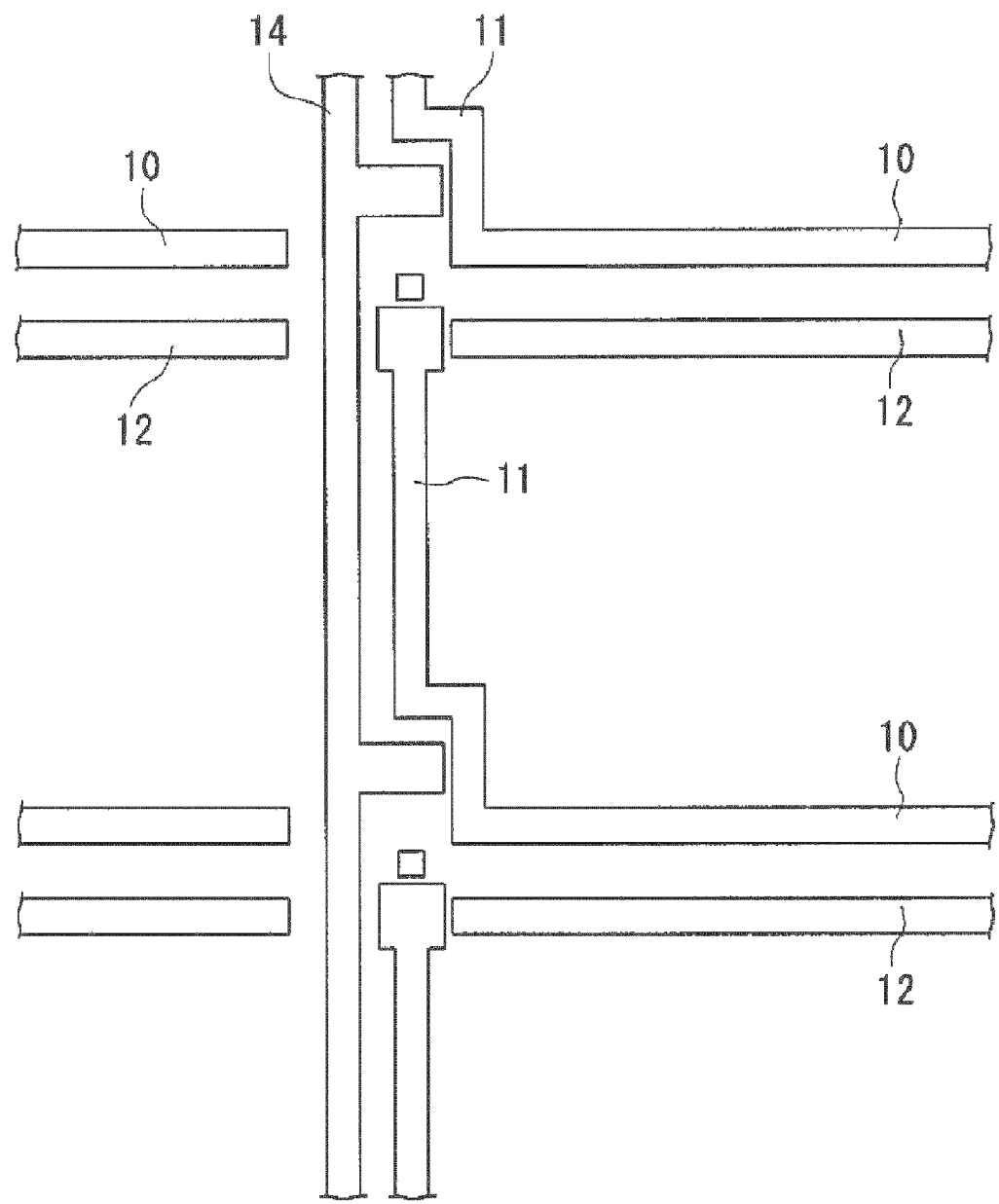
FIG. 9 is a fifth diagram illustrating a method of forming the wiring structure of the pixel included in the liquid crystal device of the first embodiment of the invention.

Then, as shown in FIG. 9, the liquid crystal scan line 10, the photo sensor scan line 12, the signal line 14, and the wiring 11 are formed. During this process, the light-shielding conductive film covers an upper portion of the photo sensor switching transistor, and protects the active layer and the drain end of the photo sensor switching transistor from being exposed to light. A common metal film is formed into a pattern so as to form the light-shielding conductive film. The metal film may be comprised of aluminum, copper, chromium, tantalum, silver, gold, iron, nickel or an alloy thereof.

Figure 14:
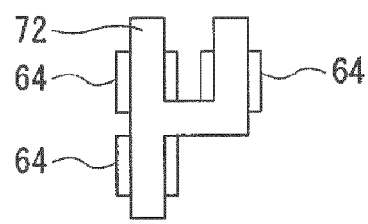
FIG. 14 is a second diagram explaining a method of forming the wiring structure of the pixel included in the liquid crystal device of the second embodiment of the invention.
Figure 14:
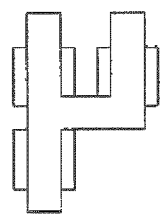

A similar series of processes is used to form the wiring structure of the pixel 16 shown in FIG. 14.

Next, the operation of the liquid crystal device of the first embodiment of the invention will be explained in detail, with reference to FIGS. 1 and 2. The operation of the liquid crystal device 1 according to the first embodiment is controlled by the controller 28. For example, when a command from the display mode is input through the input unit 32, the controller 28 sends a control signal to the switching circuit 24 so as to cause each of the signals 14 and the liquid crystal signal line driver 22 to be in a conductive state. On the other hand, when a command for an image pickup mode is input using the input unit 32, the controller 28 sends a control signal to the switching circuit 24, and makes each of the signal lines 14 and the liquid crystal signal line driver 22 be in a non-conductive state, while sending a control signal to the photo sensor signal readout circuit 26 to activate it. Accordingly, the controller 28 switches between the display mode and the image pickup mode.

Now, the display mode, the image pickup mode, and an overwriting mode which concurrently uses the display mode and the image pickup mode will be explained.

[1] Display Mode

Based on a control by the controller 28, the liquid crystal scan driver 18 provides a scanning signal with the highest electric potential (e.g. 8V) to the liquid crystal scan lines 10, while providing a scanning signal with the lowest electric potential (e.g. 0V) so as to not select the liquid crystal scan lines 10. At this time, based on a control by the controller 28, the photo sensor scan driver 20 provides a photo sensor scanning signal with the lowest electric potential (e.g. 0V) to all of the photo sensor scan lines 12. Therefore, all of the photo sensor switching transistors 42 are in an off state.

Further, based on a control of the controller 28, the liquid crystal signal line driver 22 provides a predetermined display signal to the signal lines.

In the display mode as above, based on a control of the controller 28 send to the crystal signal line driver 22, the switching circuit 24 causes each of the signal lines 14 to be in a conductive state. In this state, the liquid crystal scan driver 18 selects the liquid crystal scan lines 10. Further, the liquid crystal signal line driver 22 selects the signal lines 14, and outputs a desired display signal to the selected signal lines 14. As a result, the display signal is provided to the pixel 16 located where the liquid crystal scan line 10 selected and the selected signal line 14 intersect. Then, the liquid crystal layer 52 of each of the pixels are operated based on the display signal, thereby modulating light from the back light 100. According to this, users can visually recognize the image from the second substrate 68 side.

[2] Image Pickup Mode

When a request for "image pickup mode" is made by a user using the input unit 32, the request is sent from the input unit 32 to the controller 28. At this time, the controller 28 switches the display mode to the image pickup mode.

In this image pickup mode, the liquid crystal scan driver 18 provides a scanning signal with the lowest electric potential (e.g. 0V) to all of the liquid crystal scan lines 10, causing all of the liquid crystal switching transistors 40 become in an off state. At this time, based on a control by the controller 28, the photo sensor scan driver 20 provides a scanning signal with the highest electric potential (e.g. 8V) in order to select the photo sensor scanning signal 12. In contrast, the photo sensor scan driver 30 provides a scanning signal with the lowest electric potential (e.g. 0V) when not selecting the photo sensor scanning signal 12.

At the same time, the controller 28 provides a predetermined control signal which cuts off the connection between the liquid crystal signal line driver 22 and the signal lines 14, while operating the photo sensor signal readout circuit 26.

In the image pickup mode as above, based on a control of the controller 28, the switching circuit 24 insulates the liquid crystal signal line driver 22 and each of the signal lines 14. In this state, the photo sensor scan driver 20 selects the photo sensor scan lines 12 of the selected pixels 16. Subsequently, the photo sensor signal readout circuit 26 selects the signal lines 14 of a predetermined set of pixels 16, thereby capturing a photo sensor signal from the signal lines 14. The photo sensor readout circuit 26 includes a signal line selection circuit, such as a shift register, decoder, current measurement circuit such as an amplifier circuit, and a comparison circuit. Then, the photo sensor signal of the selected signal line 14 is measured by the current measurement circuit (where, for example, the signal is amplified or converted from analog to digital), and finally outputted to an external computing device or the like.

In the image pickup mode, the backlight 100 is preferably turned off. By turning the backlight off, the sensitivity of light sensor is improved. Further, in the overwriting mode to be described more fully below, an intermittent display can smoothly display moving images without registering image disturbance when capturing images.

Using this system, a user can write on a surface of the second substrate 68 (FIG. 3) by using a lighting system such as a pen type lighting system in order to perform an image capturing process (e.g. lettering). Typically, the pen type lighting system has a same shape as that of a common pen, with a configuration wherein an end of the pen is capable of emitting a strong light, as described more fully below. Despite this example, however, the lighting system which may be used for capturing the images is not limited to the described configuration, and any lighting devices that are small and capable of emitting a strong light can be used.

When information is captured by the system by a user writing with the pen type lighting system, as described above, the liquid crystal scan driver 18 can provide a scanning signal with the lowest electric potential (e.g. 0V) to all of the liquid crystal scan lines 10, causing the liquid crystal switching transistor 40 to be in an off state. Then, the photo sensor scan driver 20 sequentially provides a photo sensor scanning signal with the highest electric potential (e.g. 8V) to each of the photo sensor scan lines 12. That is, the photo sensor scan lines 12 are sequentially selected. Accordingly, the photo sensor switching transistor 42 coupled to the selected photo sensor scan line 12 is in an on state. While a specific photo sensor scan line 12 is selected, the signal line 14 on a row j is made to be at the highest electric potential (e.g. 8V) so that the liquid crystal switching transistor 40 has potential difference from the signal line 14.

In this state, when the semiconductor film 72 of the liquid crystal switching transistor 40 at a position corresponding to a point written by the pen type lighting system is exposed to light through the second substrate 68, light leak occurs on the exposed liquid crystal switching transistor 40 being exposed, resulting in an off current with a size that varies depending on the amount that the liquid switching transistor 40 was illuminated. The off current is sequentially read by the photo sensor signal readout circuit 26. Data read by the photo sensor signal readout circuit 26 is then inputted to the controller 28, and stored in the memory 30. Based on the captured data, the controller 28 can also determine the position of the pen being used by the user, when the user is using the pen type lighting system, by determining the position of the tip of the pen on the surface of second substrate 68. Further, since the wiring 11 is formed so as to overlap with a predetermined portion of the semiconductor film serving as the photo sensor switching transistor 42, light from the lighting system (light through the second substrate 68) does not irradiate to a portion of the semiconductor film of the photo sensor switching transistor 42, thereby preventing the current from being turned off.

The controller 28 can transfer the data corresponding to the position of the tip of the pen to a subsequent process. For example, using the pen positioning data, an overwriting process may be performed wherein the captured pen image data can be displayed simultaneously with a predetermined displayed image. Further, when the liquid crystal device 1 is installed into various electronic apparatuses, the controller 28 can convey the captured position data to a superordinate controller (not shown). Accordingly, a user command can be transferred to a subsequent process using a superordinate controller.

[3] Overwriting Mode

Next, a method of writing over a predetermined image being displayed in the display, using the position of the tip of the pen will be briefly explained.

When a user selects an operation command for "overwriting mode switching" using the input unit 32, the command is sent from the input unit 32 to the controller 28. At this time, the controller 28 switches the display mode or the image pickup mode to the overwriting mode.

In the overwriting mode, the display mode and image pickup mode, as described above, may be alternately switched at predetermined intervals. The predetermined interval is, for example, a half of the frame interval used to retain one predetermined display image. More specifically, the display mode and the image pickup mode may be alternated at a high speed in order to form one image (one frame). For example, when frame frequency is represented as $f_R$Hz, a frame period is $1/f_R$ second. Therefore, each of the display mode and the image pickup mode can be set once during the period. If the period of both the display mode and the image pickup mode is $1/(2f_R)$ second, the control of a clock signal or the like may be used.

In the case described above, the display mode and the image pickup mode are alternately switched in a frame based on the control of the controller 28. In the image pickup mode, the image displayed in the display mode may be distorted due to the occurrence of light leak. Since this may annoy users, back light is preferably turned off in order to have a dark display. Therefore, the dark display (the image pickup mode) interposes between a display image and next display image in a short period of time. This can eliminate residual images when moving objects are displayed on the liquid crystal display with a slow response, such as displays with a response of a few milliseconds. As a result, blur of outline and tail-leaving phenomenon may be prevented. In addition, if the back light is turned off, sensitivity to input with the lighting pen is improved.

In the overwriting mode described above, when image pickup is performed by a user writing on the surface of the second substrate 68 (refer to FIG. 3) of the liquid crystal device 1 with the pen type lighting system (e.g. tracing outline of the image), the controller 28 acquires readout data from the photo sensor signal readout circuit 26 in the image pickup mode allocated during a first half of one frame, and then determines the position of the tip of the pen on the display based on the readout data stored in the memory 30.

Further, the controller 28 overwrites image data of the pixel corresponding to the position on the tip of the pen based on the readout data onto the image data being currently displayed and stored in the memory 30 in a second half of the frame. Thus, an image corresponding to the new writing of the may be displayed.

The liquid crystal display 1 according to the first embodiment as above can be used as a liquid crystal display device and also as a photoelectric conversion device (image pickup device). Further, information can be directly inputted into the display surface of the liquid crystal device.

The advantages of the liquid crystal display 1 of the first embodiment described above will now be described.

The liquid crystal display 1 described above includes: the photo sensor scan lines 12 disposed parallel to the liquid crystal scan lines 10; a photo sensor switching transistor 42, which is a part of the pixel 16, having a gate coupled to the photo sensor scan line 12; and the first light-shielding film 64 covering the back light 100 side of the liquid crystal switching transistor 40 and the photo sensor switching transistor 42. Either a source or drain of the photo sensor switching transistor 42 (shown as a drain (D) in this example) coupled to a source or drain of the liquid crystal switching transistor 40 (a source (S), in this example). The remaining source or drain of the photo sensor switching transistor 42 (a source (S), in this example), is coupled to the liquid crystal scan lines 10 serving as a power source line.

In the liquid crystal device 1 described above, an off current occurs because the liquid crystal switching transistor 40 is exposed to light. Then, the liquid crystal switching transistor 40 is turned off while the photo sensor switching transistor 42 is scanned. Then, by detecting the off current through the signal lines 14, the position and current of the liquid crystal switching transistor 40 may be detected, and a signal may be created.

That is, in the liquid crystal device 1 according to the first embodiment, a pixel 16 having only two transistors, which are aligned in row and column directions, provide the liquid crystal device with a photoelectric conversion function. This simplifies the configuration of each pixel in the liquid crystal device having a photoelectric conversion function. Further, the aperture ratio and quality of image in each pixel is improved.

Another advantage of the liquid crystal device 1 is that the device 1 does not have a light-shielding object on an upper portion of the liquid crystal switching transistor 40, meaning that an off current may be reliably obtained without shielding light to the liquid crystal switching transistor 40.

Additionally, the liquid crystal device 1 has a photo sensor switching transistor 42 which is covered with the wiring 11 (comprising the same metal used for forming the signal line). By covering the switching transistor 42, the off current is prevented transferring to the photo sensor switching transistor 42.

Another advantage of the liquid crystal device 1 is that the portion 10a of crystal scan lines 10 which intersects the semiconductor film 72 among the gate electrodes of the liquid crystal switching transistor 40 are transparent. This prevents the light needed to create the off current from being blocked, thereby more assuredly providing a larger off current to the liquid crystal switching transistor 40.

Another advantage of the liquid crystal device 1 is that the device 1 has a configuration in which the liquid crystal switching transistor 40 is an off-set transistor. Thus, light enters to an intrinsic region of the semiconductor film 72 without being blocked by the gate electrode (the liquid crystal scan lines 10), providing a more reliable off current.

Additionally, in the liquid crystal device 1 described above, the liquid crystal scan lines 10 of the pixels 16 in the row direction are used as a power source coupled to the photo sensor switching transistor 42. This removes the need for a separate power source for the photo sensor switching transistor 42, thereby reducing the number of power source lines, and improving the aperture ratio of the pixels 16.

Another advantage of the liquid crystal device 1 described above is that each of the pixels 16 is provided with the storage capacitor 46, resulting in an improved display contrast.

Further, the storage capacitor 46 of the liquid crystal device 1 includes a transparent pixel electrode 48, insulating film 84 (storage capacitor dielectric film), and electrode 74 (storage capacitor electrode). Because these components are transparent, light is not blocked by the storage capacitor 46, meaning that the aperture ratio is not reduced by the storage capacitor 46, and light is able to enter to the liquid crystal switching transistor 40 without being blocked by the storage capacitor 46.

The liquid crystal device 1 described above includes: the liquid crystal scan driver 18 coupled to an end of the liquid crystal scan lines 10; the liquid crystal signal line driver 22 coupled to an end of the signal lines 14; the photo sensor scan driver 20 coupled to an end of the photo sensor scan lines 12; the switch circuit 24 disposed between the signal lines 14 and the liquid crystal signal line driver 22, capable of switching the signal lines 14 between a conductive state and a non-conductive state; and the photo sensor signal line readout circuit 26 coupled to the other end of the signal lines 14.

Further, when the signal lines 14 and the liquid crystal signal line driver 22 are made to be in a conductive state by the switching circuit 24, the liquid crystal scan lines 10 are selected by the liquid crystal scan driver 18, thereby providing an image signal to the signal lines 14. Further, when the signal lines 14 and the liquid crystal signal line driver 22 are made to be in a non-conductive state by the switching circuit 24, the off current is provided to the photo sensor signal readout circuit 26 through the signal lines 14.

As above, since the liquid crystal device 1 is provide with the switching circuit 24, detecting the position where light is irradiated from the light pen or similar device and the luminance of the light irradiated from the device can be used to simultaneously create an off current and form the image, meaning that the liquid crystal layer 52 can function and be controlled with a relatively simple configuration.

The liquid crystal device 1 described above includes the liquid crystal scan driver 18, the photo sensor scan driver 20, the liquid crystal signal line driver 22, the controller 28 controlling the photo sensor signal readout circuit 26 and the switching circuit 24, and the memory 30 coupled to the controller 28. Then, the controller 28 stores data read by the photo sensor signal readout circuit 26 in the memory 30.

According to the liquid crystal device 1 described above, the readout data stored in the memory 30 can be used in a subsequent process by the controller.

In the liquid crystal device 1, the controller 28 updates image data preliminarily stored in the memory unit 30, and supplies a control signal corresponding to the image data to the liquid crystal signal line driver 22 based on the readout data.

Accordingly, the liquid crystal device 1 can display an image corresponding to the readout data obtained by the photo sensor signal readout circuit 26.

The liquid crystal device 1 further includes the input unit 32 coupled to the controller 28. When a predetermined operation command is input with the input unit 32, the controller 28 controls the switching circuit 24 so as to cause the signal lines 14 and the liquid crystal signal line driver 22 to be in a non-conductive state, activating the photo sensor signal readout circuit 26.

Accordingly, the liquid crystal device 1 makes it easy to switch between an image display mode and a light input mode by operating the input unit 32.

Second Embodiment

Next, a second embodiment of the liquid crystal device will be described. In the description of the second embodiment, the description of the same parts as those in the first embodiment will be omitted or simplified.

Figure 10:
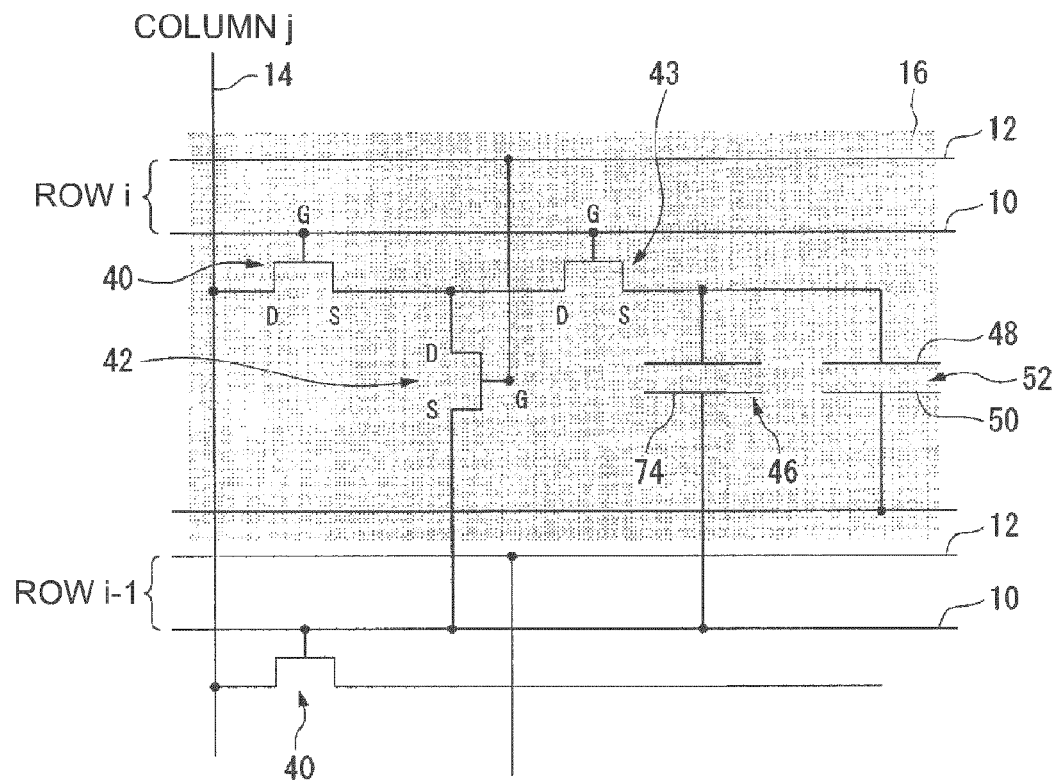
FIG. 10 is a circuit diagram illustrating a configuration of a pixel included in a liquid crystal device according to a second embodiment of the invention.

FIG. 10 is a circuit diagram illustrating a detailed configuration of a pixel 16 included in the liquid crystal device in the second embodiment. As shown in the figure, the pixel 16 included in the liquid crystal device of the second embodiment is provided with a second liquid crystal switching transistor 43 (a third transistor) coupled in series to the liquid crystal switching transistor 40 (the first transistor). In the second liquid crystal switching transistor 43, a gate (G) is coupled to the liquid crystal scan line 10 on the row i, and either a source or drain of the liquid crystal switching transistor 43 (the drain (D), in this example), is coupled to a source or drain of the liquid crystal switching transistor 40 (the drain (D), in this example). Further, the remaining source or drain of the second liquid crystal switching transistor 43 (the source (S), in this example) is coupled to the pixel electrode 48.

Figure 11:
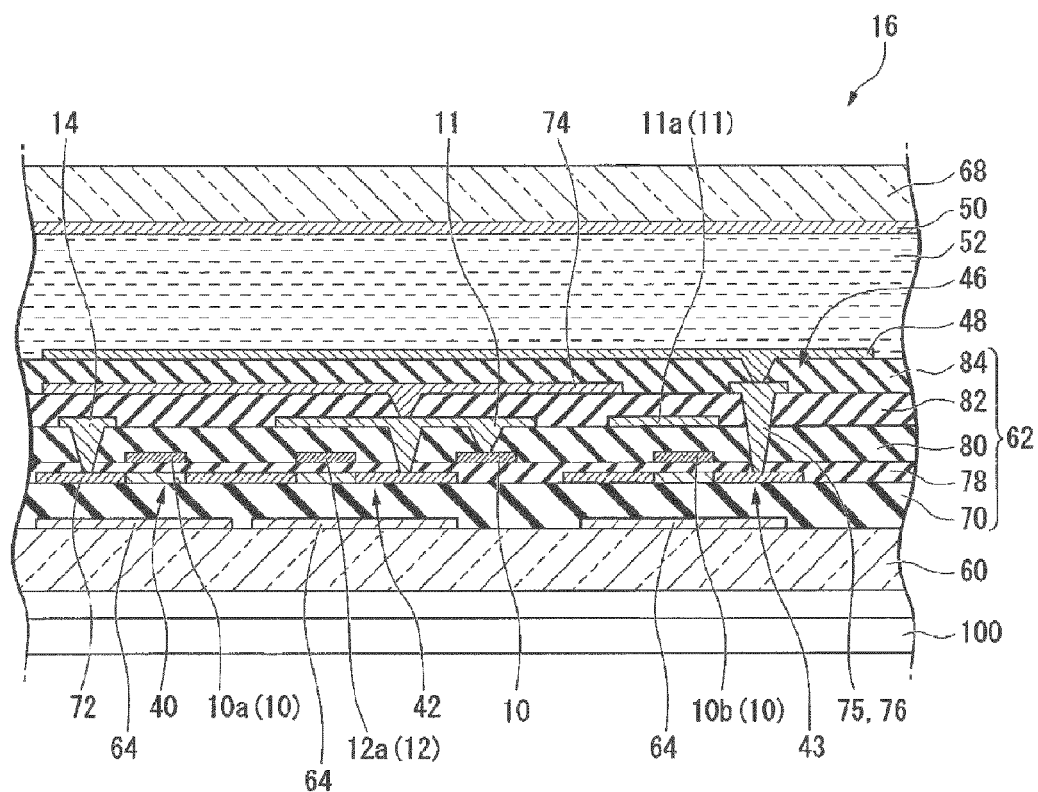
FIG. 11 is a partial sectional view schematically illustrating a sectional configuration of the pixel of the liquid crystal device of a second embodiment of the invention.

FIG. 11 is a partial sectional view schematically showing a sectional configuration of the pixel of the liquid crystal device according the second embodiment. In the FIG. 11, the liquid crystal switching transistor 40 and the second liquid crystal switching transistor 43 are shown as apart from each other for convenience of drawing. However, in reality, the source or drain of the liquid crystal switching transistor 40 (source (S), in this example) and the source or drain of the second liquid crystal switching transistor 43 (drain (D), in this example) are as shown in FIG. 10.

As shown in FIG. 11, in the second embodiment, the first light-shielding film 64 is formed under the liquid crystal switching transistor 40 photo sensor switching transistor 42, and second liquid crystal switching transistor 43. Accordingly, the semiconductor film portion of the liquid crystal switching transistor 40, semiconductor film portion of the photo sensor switching transistor 42, and a portion of semiconductor film of the second liquid crystal switching transistor 43 are shielded from the light from the backlight 100.

Similar to the first embodiment described above, the first light-shielding film 64 is preferably formed on a position so as to overlap with at least an active region of the semiconductor film portion of the liquid crystal switching transistor 40, a portion of the semiconductor film of the photo sensor switching transistor 42, and the second liquid crystal switching transistor 43. This can prevent the off current from the light of the backlight 100 from reaching the liquid crystal switching transistor 40, photo sensor switching transistor 42, and second liquid crystal switching transistor 43 caused.

In the circuit layer 62, the semiconductor film 72 is shared between the liquid crystal switching transistor 40, the photo sensor switching transistor 42, and the second liquid crystal switching transistor 43. In FIG. 11, the semiconductor film 72 of the liquid crystal switching transistor 40 and the photo sensor switching transistor 42, and the semiconductor film 72 of the second liquid crystal switching transistor 43 are shown as apart from each other. However, those semiconductor films 72 are connected to each other, as seen from the perspective direction of FIG. 11.

Further, the wiring line 11 functions as a second light-shielding film, and is formed so as to cover an active region of the semiconductor film 72 of the photo sensor switching transistor 42 and the second liquid crystal switching transistor 43 in a vertical direction.

Figure 12:
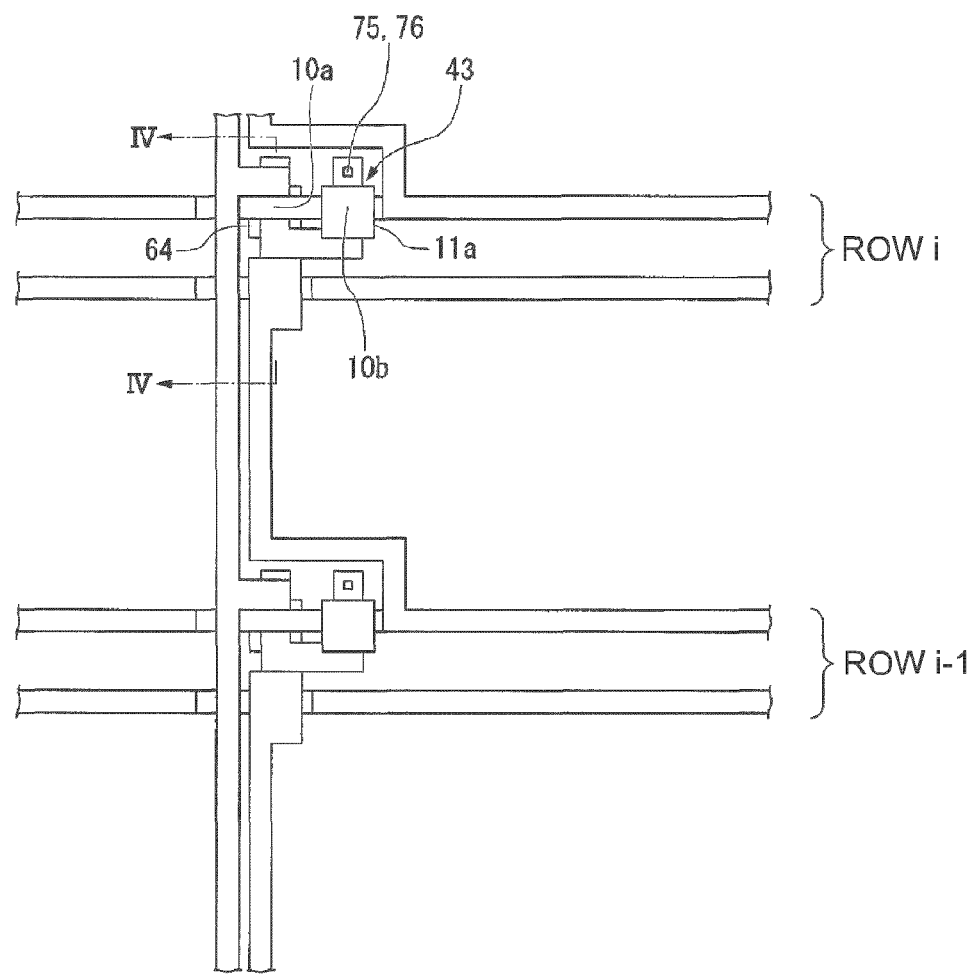
FIG. 12 is a partial plan view illustrating the wiring structure of the pixel of the liquid crystal device of the second embodiment of the invention.

Next, the wiring structure of the pixel 16 included in the liquid crystal device of the second embodiment will be explained with reference to FIG. 12. FIG. 12 is a partial plan view showing the wiring structure of the pixel 16 included in the liquid crystal device of the second embodiment. The sectional view shown in FIG. 11 corresponds approximately to the IV-IV line shown in FIG. 12. In order to facilitate understanding, the transparent conductive film and the pixel electrode are omitted.

As shown in FIGS. 11 and 12, the first light-shielding film 64 located underneath the semiconductor film 72, and is arranged so as to overlap with the active region of the semiconductor film portion of the liquid crystal switching transistor 40, as well as the active region of the semiconductor film portion of the photo sensor switching transistor 42 and the active region of the semiconductor film portion of the second liquid crystal switching transistor 43.

The semiconductor film 72 is shared among the liquid crystal switching transistor 40, the photo sensor switching transistor 42, and the second liquid crystal switching transistor 43. On a layer further above the semiconductor film 72, the liquid crystal scan line 10 and the photo sensor scan line 12 are formed.

The portion 10a of the liquid crystal scan lines 10 being intersected with the semiconductor film 72, which serves as a gate electrode of the liquid crystal switching transistor 40, and a portion 10b serving as a gate electrode of the second liquid crystal switching transistor 43 are preferably formed with a transparent conductive member such as ITO. Similarly a portion 12a of the photo sensor scan line 12 which intersects with the semiconductor film 72, which serves as a gate electrode of the photo sensor switching transistor 42 is also preferably formed with a transparent conductive member such as ITO.

Then, the wiring line 11 is formed so as to cover the active region of the semiconductor film 72 of the photo sensor switching transistor 42 and the second liquid crystal switching transistor 43.

In the second embodiment, the contact holes 75 and 76 serve to electrically couple the semiconductor film 72 and the pixel electrode 48 are coupled either the source or drain of the semiconductor film (the source (S) in this example), which serves as the second liquid crystal switching transistor 43.

The method of forming the wiring is shown in FIGS. 13 through 17. The forming steps will be briefly described, while the descriptions for insulating the films between the wirings will be omitted.

Figure 13:
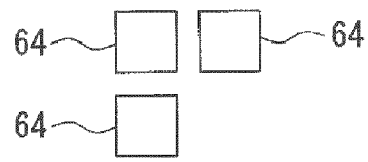
FIG. 13 is a first diagram explaining a method of forming the wiring structure of the pixel included in the liquid crystal device of the second embodiment of the invention.
Figure 13:
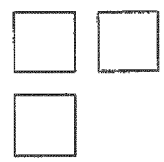
Figure 15:
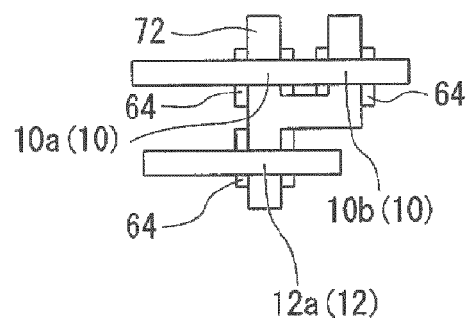
FIG. 15 is a third diagram explaining a method of forming the wiring structure of the pixel included in the liquid crystal device of the second embodiment of the invention.
Figure 15:
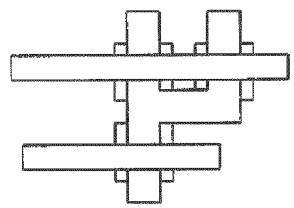

First, as shown in FIG. 13, the first light-shielding film 64 is formed in a predetermined position on the first substrate 60. Next, as shown in FIG. 14, the semiconductor film 72 is formed so that a part of the semiconductor film 72 overlaps with the first light-shielding film 64. Then, as shown in FIG. 15, a portion 10a of the liquid crystal scan lines 10 is formed on an upper layer of the semiconductor film 72. The portion 10a serves as the gate electrode of the liquid crystal switching transistor 40. Similarly, a portion 10b which serves as the gate electrode of the second liquid crystal switching transistor 43, and a portion 12a which serves as the gate electrode of the photo sensor scan line 12 are formed on upper layer of the semiconductor film 72.

Figure 16:
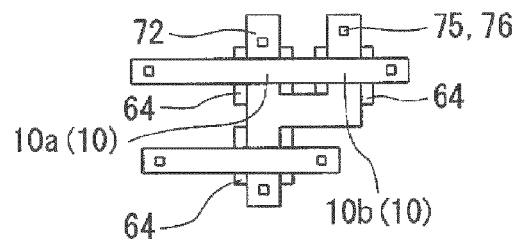
FIG. 16 is a fourth diagram explaining a method of forming the wiring structure of the pixel included in the liquid crystal device of the second embodiment of the invention.
Figure 16:
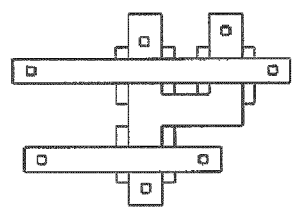
Figure 17:
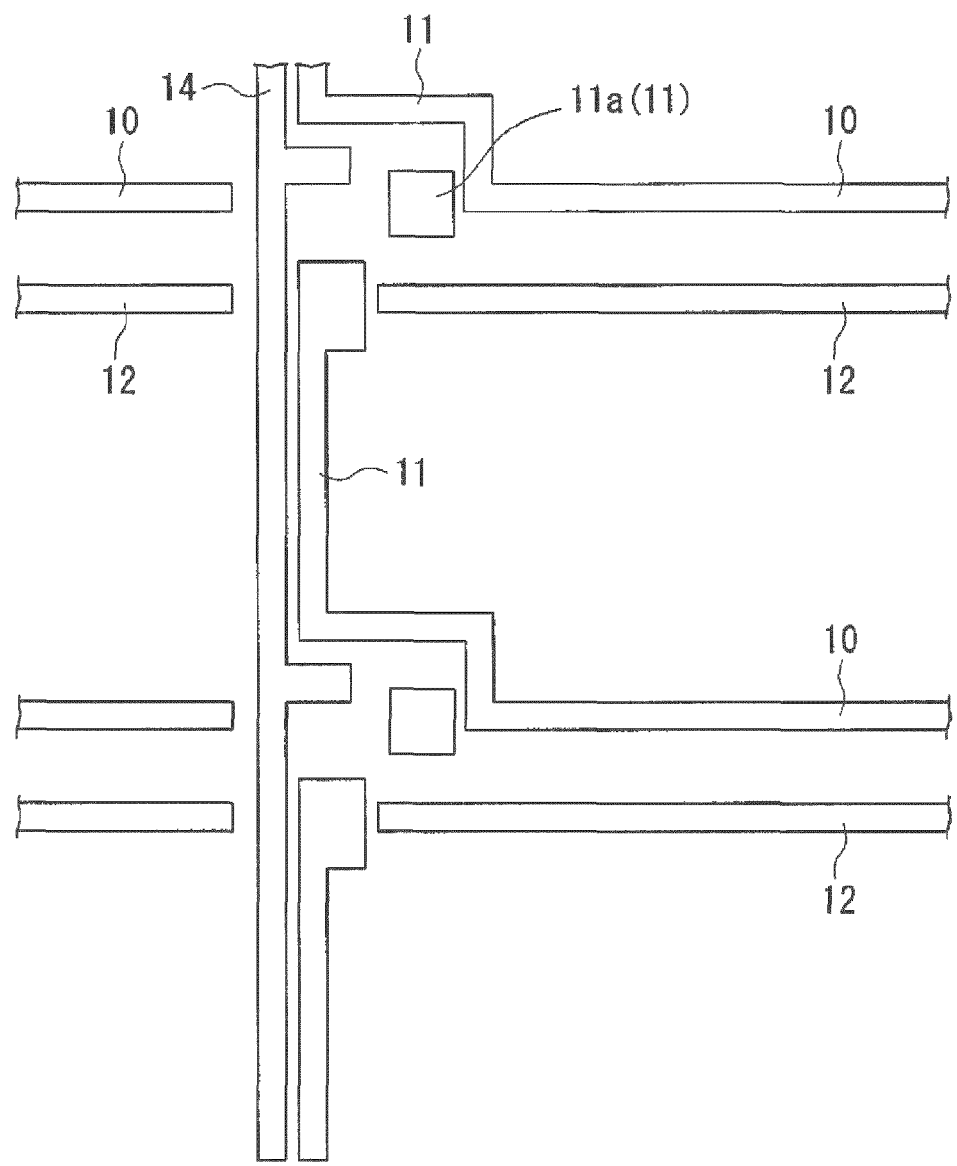
FIG. 17 is a fifth diagram explaining a method of forming the wiring structure of the pixel included in the liquid crystal device of the second embodiment of the invention.

Next, as shown in FIG. 16, a plurality of contact holes are formed in predetermined positions on the insulating film. Then, as shown in FIG. 16, the liquid crystal scan lines 10, photo sensor scan lines 12, signal lines 14, and wirings 11 are formed. Thus, the wiring structure of the pixel 16 shown in FIG. 14 is formed.

Similar to the first embodiment of the liquid crystal device, in the configuration described above, light leak occurs on the liquid crystal switching transistor 40 being exposed to light, resulting in an off current with a size which varies depending on the amount that the switching transistor 40 is illuminated. In this configuration, however, the second liquid crystal switching transistor 43 is placed between the first light-shielding film 64 and the portion 11a of the wiring 11. Therefore, when light is irradiated to the liquid crystal switching transistor 40, the second liquid crystal switching transistor 43 is not exposed to light, meaning that the light leak does affect the second liquid crystal switching. As a result, an off current does not occur.

Therefore, while the liquid crystal switching transistor 40 functions as a photo sensor, the second liquid crystal switching transistor 43 remains unaffected and functions normally As described above, the liquid crystal device of the second embodiment has the advantage wherein image disturbance is eliminated while allowing a light input (image pickup mode). Moreover, the second embodiment has the same advantageous effects described in reference to the first embodiment.

[Electronic Apparatus]

Next, an electronic apparatus equipped with the liquid crystal device described above will be described.

Figure 18:
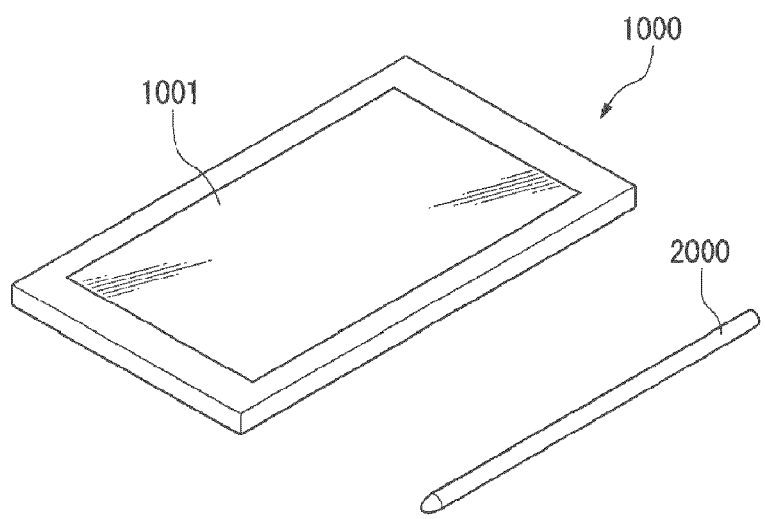
FIG. 18 is a perspective view illustrating an example of an electronic apparatus provided with a liquid crystal device comprising a display according to the first embodiment of the invention.

FIG. 18 is a perspective view illustrating a Personal Digital Assistant (PDA) 1000 as an example of an electronic apparatus that may be used in association with the present invention. The PDA 1000 includes the liquid crystal display device of the embodiments described above as a display 1001. Further, the PDA 1000 is provided with a pen type lighting system (light irradiation device) for a light input to the display 1001.

Figure 19:
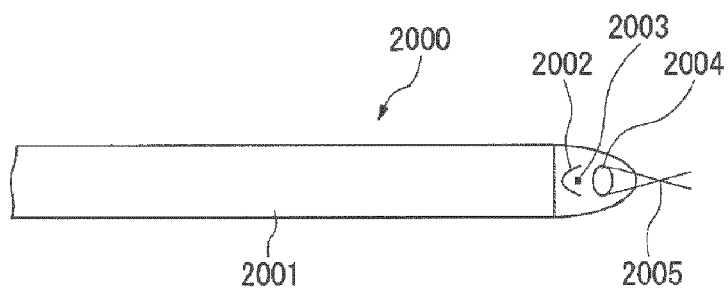
FIG. 19 is a schematic diagram explaining a configuration example of a pen-type lighting system.

FIG. 19 shows a schematic view explaining a configuration example of the pen type lighting system. In FIG. 19, the pen type lighting system is shown in a plan view, and an end (a tip of the pen) is partially shown in a sectional view. A pen type lighting system 2000 shown in the figure includes a reflector 2002, a LED light source 2003, and a lens 2004 that are built in the end side of a main body 2001. Light radiated from the LED light source 2003 enters to the lens 2004 directly or by being reflected. The light entered is collected to a focal point 2005 by the lens 2004. The light collected at the focal point 2005 is subsequently radiated. The LED light source 2003 is just one example of a light source that may be used in association with the invention; other light sources may also be used. The pen type lighting system 2000 as described above can give light with high luminance at the focal point 2005 to the liquid crystal switching transistor 40 of the liquid crystal device.

Here, the conditions which allow a user to input by writing with the pen type lighting system depend on the solar illumination, meaning that the outside weather may affect the inputting process. For example, solar illumination of rainy weather or dark weather is about 2000 lux, while solar illumination of clear weather is about 100,000 lux. Because the off-current of a thin film transistor is proportional to the amount of light irradiated, the off current at 0 (zero) lux is 1 picoampere (pA) and the on current at 10,000 lux is about 10 pA, while the off current under sunlight of clear weather (100,000 lux of illumination) is about 100 pA. Further, if a high illumination LED known in the current art is used, illumination of a beam with 10 mm in diameter is about 100,000 lux. Therefore, if the diameter of the beam is narrowed down to 1 mm by the lens 2004, illumination at the focal point 2005 is about 10,000,000. That is, illumination obtained at the focal point 2005 is about 100 times more than that of clear weather. An off current of a thin film transistor with respect to the illumination at the focal point 2005 is about 10000 pA. This value is sufficient to determine if light is irradiated or not. Since a light emitting portion of a LED light source is normally about 0.2 mm by 0.2 mm, light can be focused into this size by the lens 2004. In this size, illumination can easily exceed one hundred million lux, and become 1000 times or more than the solar light in detected in clear weather. Thus, the off current of a thin film transistor becomes 1000 times or more than the off-current detected in clear weather. Accordingly, the pen type lighting system 2000 enables inputting regardless of the weather.

Figure 20:
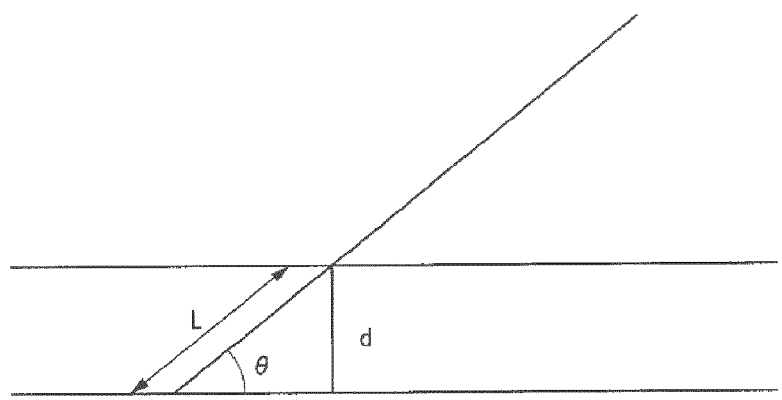
FIG. 20 is a diagram explaining a distance from a tip of the pen-type lighting system to a focal point.

Here, a preferable range of a distance from the tip of the pen type lighting system 2000 to the focal point 2005 will be explained with reference to FIG. 20. A distance L between the tip of the pen and the liquid crystal switching transistor 40 as shown in the figure is represented by a following formula.

$$L = d\sqrt{\frac{1}{\tan^2\theta} + 1}$$ [Formula 1]

where a distance between the tip of the pen and the focal point 2005 is L, and a thickness of the second substrate 68 and the liquid crystal layer 52 of the liquid crystal device is d.

When an angle θ of 60 to 80 degrees, which is a range for an angle of a pen being naturally held by a human, is substituted for θ, a favorable range of the distance L is 1.015 d≦L≦1.155 d. Therefore, it is preferable to use the lens 2004 having a focal length corresponding to these values.

The liquid crystal device previously described can be applied not only to PDAs, but also to cellular phones, electronic books, personal computers, digital still cameras, liquid crystal televisions, video tape recorders of viewfinder types or monitor viewing types, car navigation devices, pagers, electronic notebooks, electric calculators, word processors, work stations, picture phones, point-of-sale (POS) terminals, apparatuses equipped with a touch panel, and on the like.

The advantageous effects of the electronic apparatuses described above will now be described.

Since the liquid crystal device of the embodiments above is applied as a display, the electronic apparatuses are provided with a display having a simple configuration and a photoelectric conversion function.

The electronic apparatuses described above are provided with the pen type lighting system 2000. Therefore, light is ensured to input to the liquid crystal device.

While the preferred embodiments of the liquid crystal device and the electronic apparatus according to the invention have been described with reference to the accompanied drawings, it is needless to say that the invention is not limited to the above embodiments. The shapes, combinations or the like of the components described in the above embodiments are presented by way of example. Various modifications can be made in accordance with design requirements or the like, without departing from the spirit and scope of the present invention.

Figure 21:
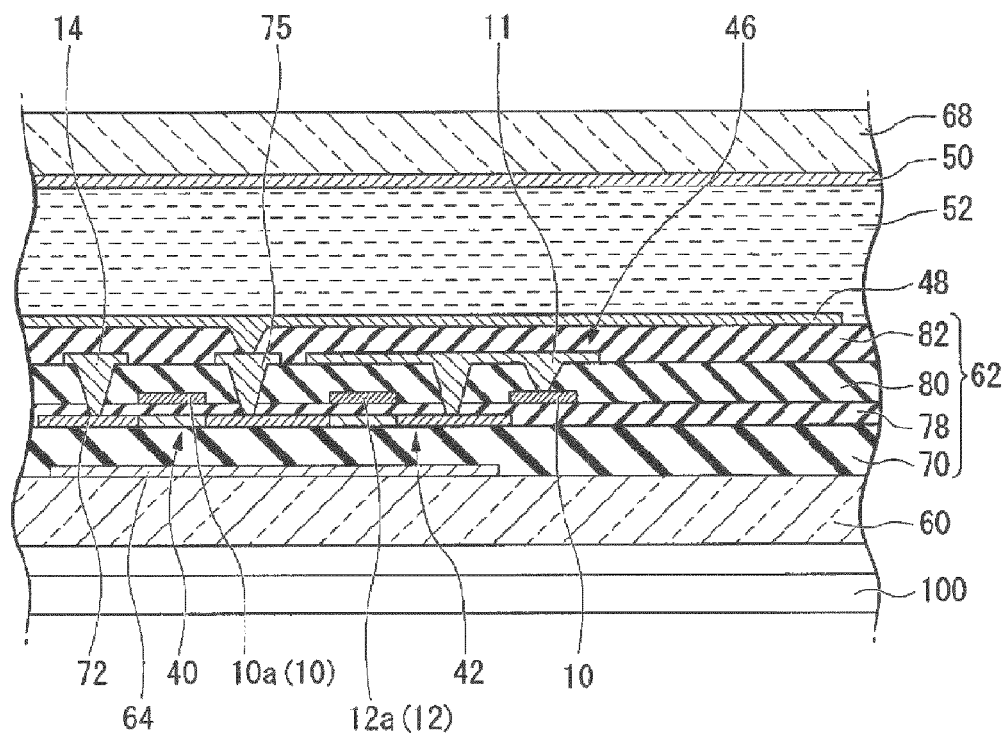
FIG. 21 is a partial sectional view schematically illustrating a modification of the configuration of the liquid crystal device of the first embodiment.

For example, in the first embodiment above, the one electrode 74 (refer to FIG. 3) is formed on the wiring 11, and a configuration in which the one electrode 74 is used as a storage capacitor electrode of the storage capacitor 46 has been explained. By employing the configuration as above, large capacitance of the storage capacitor is realized, which improves the grayscale level of the liquid crystal device 1. However, since small storage capacitance is enough for the liquid crystal device, the pixel electrode 48 (transparent electrode) and the wiring 11 (storage capacitor electrode) can serve as electrodes without forming the one electrode 74, while a second interlayer insulating film can be formed between them as a storage capacitor dielectric film as shown in FIG. 21.

By employing the configuration above, the wiring layers and the insulating layers is reduced, thereby simplifying manufacturing steps. Further, since each one of the wiring layers and the insulating layers is reduced, transmissivity of light is increased, resulting in a bright display.

Figure 22:
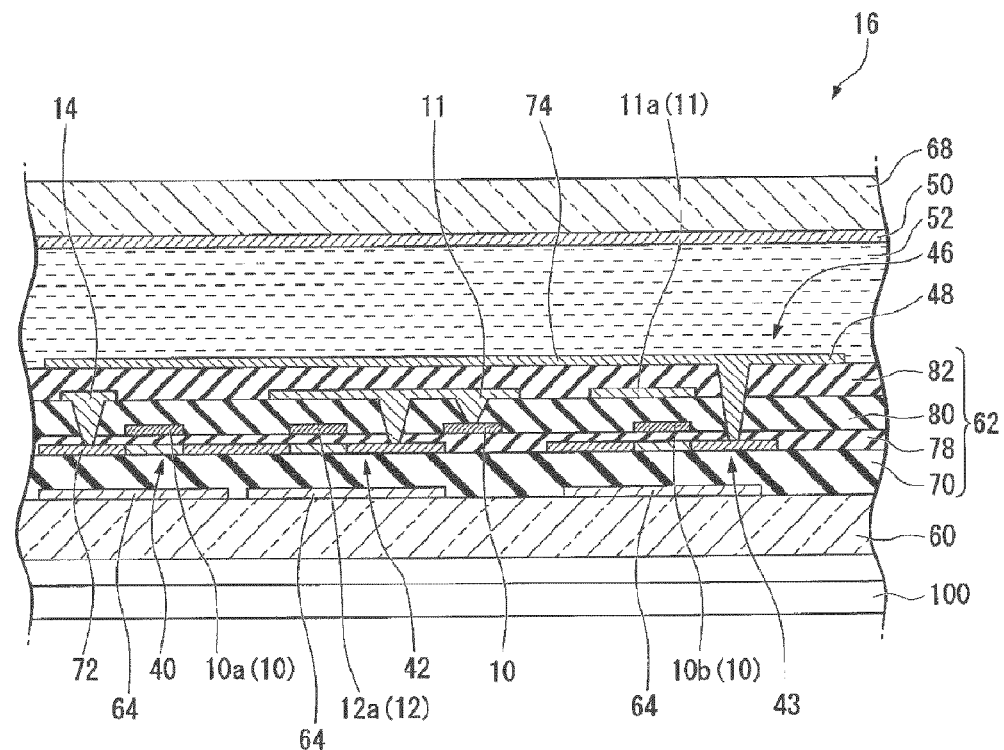
FIG. 22 is a partial sectional view schematically illustrating a modification of the configuration of the liquid crystal device of the second embodiment.

Further, in the second embodiment above, the pixel electrode 48 (transparent electrode) and the wiring 11 (storage capacitor electrode) can also serve as electrodes without forming the one electrode 74, then the second interlayer insulating film can be formed between them as the storage capacitor dielectric film as shown in FIG. 22.

By employing the configuration above, each one of the wiring layers and the insulating layers is reduced, manufacturing steps for the liquid crystal device in the second embodiment can be also simplified. Further, since each one of the wiring layers and the insulating layers is reduced, transmissivity of light is increased, resulting in a bright display.

Further, for example, it is possible that a plurality of ammeters are placed on the photo sensor signal readout circuit 26 so as to concurrently measure currents of different signal lines 14 with the plurality of ammeters, concurrently measuring currents from the plurality of pixels 16.

What is claimed is:

1. A liquid crystal device, comprising:
a first scan line;
a second scan line arranged in parallel with the first scan line;
a signal line arranged so as to intersect with the first scan line;
a pixel arranged in a matrix with respect to the intersection between the first scan line and the signal line, the pixel including:
a first transistor having a gate coupled to the first scan line, and a source drain, wherein either the source or drain is coupled to the signal line;
a pixel electrode coupled to the source or drain of the first transistor that is not coupled the signal line;
a common electrode, which faces the pixel electrode;
a liquid crystal layer disposed between the pixel electrode and the common electrode; and
a second transistor having a gate coupled to the second scan line and a source and drain, wherein either the source or drain is coupled to the source or drain of the first transistor that is not coupled to the signal line, and the other source or drain of the second transistor is coupled to a power source line; and
a first light shielding film which covers one side of the first transistor and the second transistor of the pixel,
wherein the power source line is the first scan line of the pixel in a row direction.

2. The liquid crystal device according to claim 1, the liquid crystal device further comprising a second light-shielding film which covers the remaining side of the second transistor.

3. The liquid crystal device according to claim 2, wherein the second light-shielding film is a wiring made of metal.

4. The liquid crystal device according to claim 1, wherein the gate electrode of the first transistor is a transparent electrode.

5. The liquid crystal device according to claim 1, wherein the first transistor is an offset transistor having an intrinsic region formed between a channel region and a source and/or drain region of the semiconductor film.

6. The liquid crystal device according to claim 1, wherein the pixel includes a storage capacitor having one electrode coupled to either source or drain of the first transistor that is not coupled to the signal line, and another electrode which is coupled to the first scan line of an adjacent pixel in a row direction.

7. The liquid crystal device according to claim 6, wherein the storage capacitor includes the pixel electrode, a storage capacitor electrode, and a storage capacitor dielectric film disposed between the pixel electrode and the storage capacitor electrode, wherein the pixel electrode, the storage capacitor electrode, and the storage capacitor dielectric film are transparent.

8. An electronic apparatus comprising the liquid crystal device of claim 1 as a display.

9. The electronic apparatus according to claim 8 further comprising a lighting system for an optical input to the liquid crystal device.

10. A liquid crystal device, comprising:
a first scan line;
a second scan line arranged in parallel with the first scan line;
a signal line arranged so as to intersect with the first scan line;
a pixel arranged in a matrix with respect to the intersection between the first scan line and the signal line, the pixel including:
a first transistor having a gate coupled to the first scan line, and a source drain, wherein either the source or drain is coupled to the signal line;
a pixel electrode coupled to the source or drain of the first transistor that is not coupled the signal line;
a common electrode, which faces the pixel electrode;
a liquid crystal layer disposed between the pixel electrode and the common electrode; and
a second transistor having a gate coupled to the second scan line and a source and drain, wherein either the source or drain is coupled to the source or drain of the first transistor that is not coupled to the signal line, and the other source or drain of the second transistor is coupled to a power source line; and
a first light shielding film which covers one side of the first transistor and the second transistor of the pixel;
a first scan driver coupled to one end of the first scan line;
a signal line driver coupled to one end of the signal line;
a second scan driver coupled to one end of the second scan line;
a switching circuit disposed between the signal line and the signal line driver, which is capable of switching the signal line and signal line driver between a conductive state and a non-conductive state; and
a photo sensor signal readout circuit coupled to the other end of the signal line.

11. The liquid crystal device according to claim 10, further comprising:
a controller capable of controlling the first scan driver, the second scan driver, the signal line driver, the photo sensor signal readout circuit, and the switching circuit; and
a memory coupled with the controller, the controller being capable of storing the data readout by the photo sensor signal readout circuit in the memory.

12. The liquid crystal device according to claim 11, wherein the controller updates image data stored in the memory and supplies a control signal corresponding to the image data to the signal line driver based on the readout data.

13. The liquid crystal device according to claim 11 further comprising an input unit coupled to the controller, wherein the controller is capable of controlling the switching circuit so as to make the signal line and the signal line driver be in a non-conductive state, and wherein the controller is further capable of activating the photo sensor signal readout circuit if a predetermined operation command is input with the input unit.

14. The liquid crystal device according to claim 11, further comprising an input unit coupled to the controller, wherein the controller is capable of controlling the switching circuit so as to make the signal line and the signal line driver alternate between a conductive state and a non-conductive state at predetermined time intervals if a predetermined operation command is input with the input unit, wherein the controller is further capable of activating the photo sensor signal readout circuit when the signal line and the signal line driver are in the non-conductive state.

15. An electronic apparatus comprising:
a display comprising a liquid crystal device, the liquid crystal device comprising:
a first scan line;
a second scan line arranged in parallel with the first scan line;
a signal line arranged so as to intersect with the first scan line;
a pixel arranged in a matrix with respect to the intersection between the first scan line and the signal line, the pixel including:
a first transistor having a gate coupled to the first scan line, and a source drain, wherein either the source or drain is coupled to the signal line;
a pixel electrode coupled to the source or drain of the first transistor that is not coupled the signal line;
a common electrode, which faces the pixel electrode;
a liquid crystal layer disposed between the pixel electrode and the common electrode; and
a second transistor having a gate coupled to the second scan line and a source and drain, wherein either the source or drain is coupled to the source or drain of the first transistor that is not coupled to the signal line, and the other source or drain of the second transistor is coupled to a power source line;
a first light shielding film which covers one side of the first transistor and the second transistor of the pixel;
a second light-shielding film which covers the remaining side of the second transistor; and
a lighting system for an optical input to the liquid crystal device,
wherein the power source line is the first scan line of the pixel in a row direction.

* * * * *